(No Model.)
H. P. DURING.
ADJUSTABLE COFFEE POT ATTACHMENT.
No. 528,594. Patented Nov. 6, 1894.
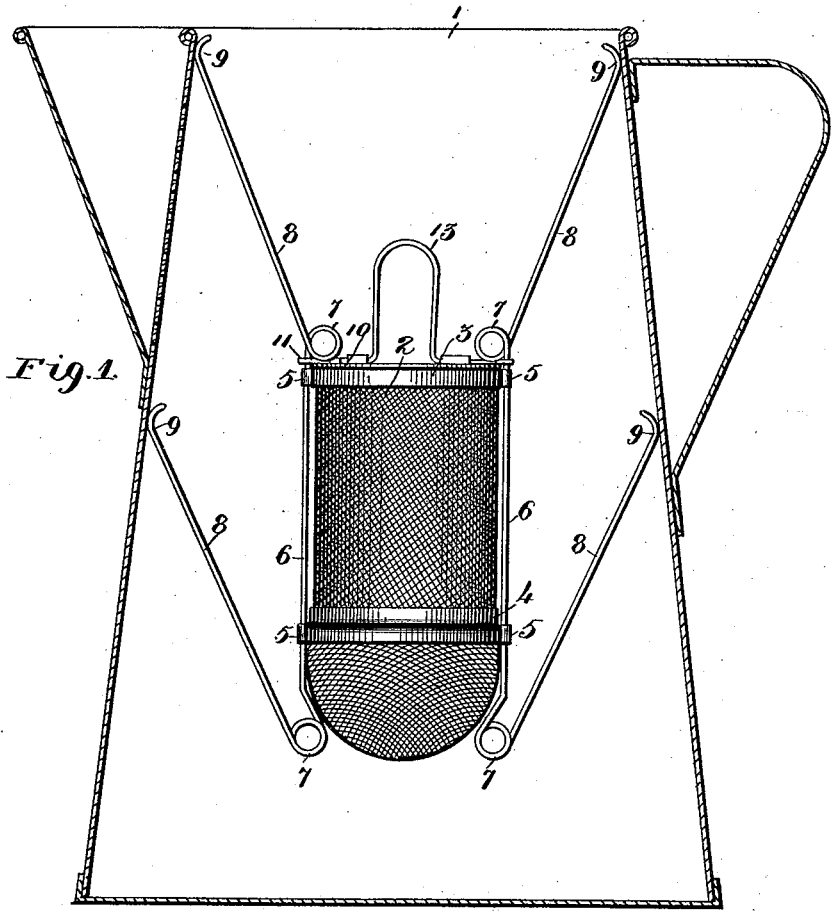
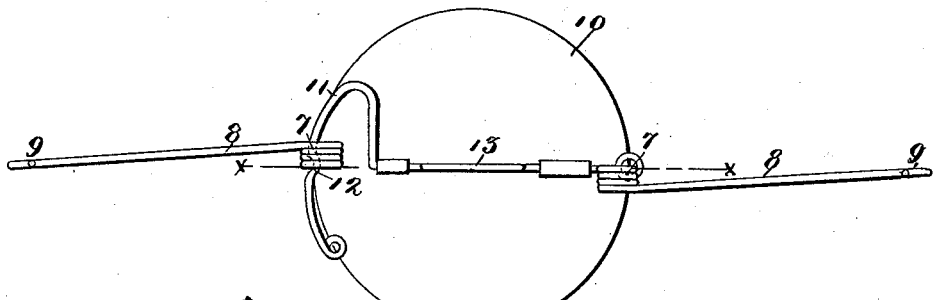
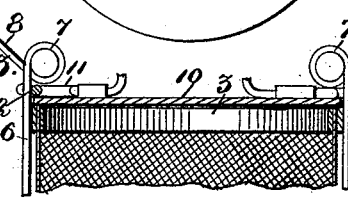

UNITED STATES PATENT OFFICE.

HARRY P. DURING, OF ST. LOUIS, MISSOURI.

ADJUSTABLE COFFEE-POT ATTACHMENT.

SPECIFICATION forming part of Letters Patent No. 528,594, dated November 6, 1894.

Application filed January 29, 1894. Serial No. 498,314. (No model.)

*To all whom it may concern:*

Be it known that I, HARRY P. DURING, of the city of St. Louis, State of Missouri, have invented certain new and useful Improvements in Coffee-Pot Attachments, of which the following is a full, clear, and exact description, reference being had to the accompanying drawings, forming a part hereof.

The present device has relation to improvements in coffee pot attachments and consists in the novel arrangement and combination of parts more fully set forth in the specification and pointed out in the claims.

In the drawings, Figure 1 is a vertical section of a coffee pot having my invention applied thereto. Fig. 2 is a plan view of the device; and Fig. 3 is a section on the line $x$—$x$ of Fig. 2.

The object of the present invention is to construct an attachment which shall be cheap, and durable and present the advantage of being adapted to be inserted into pots of various sizes, forms and diameters, and is moreover readily detachable. In detail it may be described as follows:

Referring to the drawings, 1 represents a coffee pot having my invention applied thereto. The attachment is composed of a suitable wire gauze or metallic perforated holder 2 for the coffee the form of said holder being cylindrical and with a curved bottom. The holder is reinforced by a terminal rim 3 and an intermediate rim 4, the said rims having suitably disposed eyes or loops 5 arranged in line with one another for the passage and reception of the brace rods or wires 6, the said wires following the contour of the holder as best seen in Fig. 1. At either end of each wire 6 is a coil 7 which in turn terminates in the expanding and resilient extension arms 8 having inwardly turned ends 9 as best seen in Fig. 1. The coils 7 being elastic have a tendency to keep the arms 8 expanded and the latter being resilient the attachment may be made to enter a pot of any size and dimension.

The holder 2 is provided with a suitable cover or disk 10 which is suitably pivoted to one of the rods 6 immediately below the coil 7 and above the rim 3. Diametrically opposite to the hinge or pivotal point of the disk 10 is a retaining spring 11 suitably curved so as to engage in the act of closing, the opposite wire 6, the said spring 11 having a suitable depression 12 for engaging the wire 6 immediately under the coil 7 and thus retain the disk or cover in place. The disk or cover is provided with a suitable handle 13.

The several parts, that is the wires, retaining spring and handle may be retained in place by solder or any equivalent methods known and I do not limit myself to the precise details here shown. Neither do I limit the present invention to the application to coffee pots but it may be used in other relations and for similar purposes.

Having described my invention, what I claim is—

1. A coffee pot attachment comprising a suitable holder, reinforcing rims disposed along the same, a series of brace rods secured to said rims, terminal coils for said rods, and resilient arms projecting from said coils, substantially as set forth.

2. A coffee pot attachment comprising a suitable gauze or metallic holder, a terminal reinforcing rim for the same, a second intermediate reinforcing rim, a series of brace rods secured to said rims adjacent to the holder and following the contour thereof, terminal coils on said rods, resilient arms projecting from said coils and having inwardly turned ends, a disk or cover pivoted to one of said brace rods, a retaining spring on said cover having a suitable depression co-operating with the opposite rod, and a suitable handle for said disk, substantially as set forth.

In testimony whereof I affix my signature in the presence of two witnesses.

HARRY P. DURING.

Witnesses:
C. T. KELLAR,
EMIL STAREK.